(12) United States Patent
Zlaty et al.

(10) Patent No.: US 10,795,903 B2
(45) Date of Patent: Oct. 6, 2020

(54) METHOD AND SYSTEM FOR DETERMINING DATA USAGE BEHAVIOR IN A DATABASE SYSTEM

(71) Applicant: DataVard AG, Heidelberg (DE)

(72) Inventors: Martin Zlaty, Bratislava (SK); Branislav Cik, Bratislava-Jarovce (SK)

(73) Assignee: DataVard GmbH, Heidelberg (DE)

( * ) Notice: Subject to any disclaimer, the term of this patent is extended or adjusted under 35 U.S.C. 154(b) by 232 days.

(21) Appl. No.: 15/723,681

(22) Filed: Oct. 3, 2017

(65) Prior Publication Data

US 2018/0095972 A1 Apr. 5, 2018

(30) Foreign Application Priority Data

Oct. 4, 2016 (EP) .................................... 16192248

(51) Int. Cl.
*G06F 16/25* (2019.01)
*G06Q 10/06* (2012.01)
(Continued)

(52) U.S. Cl.
CPC ........ *G06F 16/252* (2019.01); *G06F 16/2457* (2019.01); *G06F 16/24578* (2019.01); *G06F 16/287* (2019.01); *G06Q 10/06315* (2013.01)

(58) Field of Classification Search
CPC .. G06F 16/252; G06F 16/287; G06F 16/2457; G06Q 10/06315
See application file for complete search history.

(56) References Cited

U.S. PATENT DOCUMENTS 6,405,187 B1 * 6/2002 Egan .................. G06F 16/2228
8,903,801 B2 12/2014 Dias et al.
(Continued)

FOREIGN PATENT DOCUMENTS

CN 104636257 A 5/2015

OTHER PUBLICATIONS

Communication pursuant to Article 94(3) EPCt issued for EP Application No. 16192248.9 dated Mar. 29, 2017, 9 pages.
(Continued)

*Primary Examiner* — Apu M Mofiz
*Assistant Examiner* — Husam Turki Samara
(74) *Attorney, Agent, or Firm* — Brake Hughes Bellermann LLP

(57) ABSTRACT

Systems and methods are described for determining data usage behavior in a database system. The systems and methods can include receiving, from one or more applications, a plurality of SQL queries, storing the received SQL queries, receiving one or more characteristics, each characteristic relating to one or more respective fields, determining one or more data usage categories, wherein a data usage category has one or more characteristics values corresponding to one or more stored field values of the one or more respective fields, comparing the data selection condition of at least one stored SQL query with the determined one or more data usage categories, and incrementing a data usage counter associated with a identified data usage category if the data selection condition of the at least one stored SQL query indicates at least one query access to stored data including field values in accordance with the identified data usage category.

20 Claims, 15 Drawing Sheets

(51) Int. Cl.
      *G06F 16/28*       (2019.01)
      *G06F 16/2457*     (2019.01)

(56) References Cited

U.S. PATENT DOCUMENTS

| | | |
|---|---|---|
| 9,213,700 B2 | 12/2015 | Panda et al. |
| 2008/0052271 A1 | 2/2008 | Lam |
| 2011/0078135 A1 | 3/2011 | Whitehead et al. |
| 2011/0213789 A1 | 9/2011 | Doshi et al. |
| 2015/0066987 A1 | 3/2015 | Nelke et al. |

OTHER PUBLICATIONS

European Search Report issued for EP Application No. 16192248.9 dated Mar. 20, 2017, 4 pages.

* cited by examiner

| F1 | F2 | F3 | F4 | F5 |
|---|---|---|---|---|
| Document number | Creation date | Company Code | Value | Currency |
| 1234801 | 1.1.2016 | 1000 | 500 | EUR |
| 3480123 | 31.12.2016 | 1000 | 300 | EUR |
| 3231208 | 5.7.2016 | 2000 | 7500 | USD |
| 3108080432 | 2.7.2015 | 1000 | 2300 | EUR |
| 1032420 | 6.2.2014 | 3000 | 7200 | EUR |
| 1034789590 | 6.10.2014 | 3000 | 4100 | AUD |
| 36789590 | 6.10.2014 | 2000 | 3300 | AUD |
| 376789590 | 6.12.2013 | 1000 | 600 | USD |

C1 = Currency ~ F5
C2 = CompanyCode ~ F3

| Currency / CompanyCode | 1000 | 2000 | 3000 |
|---|---|---|---|
| EUR | x | N/A | x |
| USD | x | x | N/A |
| AUD | N/A | x | x |

T1i

V1 — EUR, 1000
V2 — EUR, 3000
V3 — USD, 1000
V4 — USD, 2000
V5 — AUD, 2000
V6 — AUD, 3000

DUC_V1

FIG. 4

SQL_1:  SELECT ALL FROM T1 WHERE F5=EUR

SQL_1a:  SELECT DISTINCT F3, F5 FROM T1 WHERE F5=EUR

SQL_2:  SELECT ALL FROM T1 WHERE F3=1000

| 1234801 | 1.1.2016 | 1000 | 500 | EUR |
| --- | --- | --- | --- | --- |
| 3480123 | 31.12.2016 | 1000 | 300 | EUR |
| 3108080432 | 2.7.2015 | 1000 | 2300 | EUR |
| 376789590 | 6.12.2013 | 1000 | 7200 | USD |

SQL_2r

SQL_2a:  SELECT DISTINCT F3, F5 FROM T1 WHERE F3=1000

| 1000 | EUR |
| --- | --- |
| 1000 | USD |

SQL_2ar

V1 — EUR, 1000    <--->  CNT1 = CNT1 + 1
V2 — EUR, 3000    <--->  CNT2
V3 — USD, 1000    <--->  CNT3 = CNT3 + 1
V4 — USD, 2000    <--->  CNT4
V5 — AUD, 2000    <--->  CNT5
V6 — AUD, 3000    <--->  CNT6

DUC_V1

C1, C2 / SQL_1, SQL_2

| Currency / CompanyCode | 1000 | 2000 | 3000 |
|---|---|---|---|
| EUR | 2 | N/A | 1 |
| USD | 1 | 0 | N/A |
| AUD | N/A | 0 | 0 |

T1acc

| F1 | F2 | F6 | F7 | F4 | F5 |
|---|---|---|---|---|---|
| Document number | Creation date | Company Code_from | Company Code_to | Value | Currency |
| 1234801 | 1.1.2016 | 1000 | 2000 | 500 | EUR |
| 3480123 | 31.12.2016 | 1000 | 3000 | 300 | EUR |
| 3231208 | 5.7.2016 | 2000 | 2000 | 7500 | USD |
| 3108080432 | 2.7.2015 | 1000 | 2000 | 2300 | EUR |
| 1032420 | 6.2.2014 | 3000 | 3000 | 7200 | EUR |
| 1034789590 | 6.10.2014 | 3000 | 1000 | 4100 | AUD |
| 36789590 | 6.10.2014 | 2000 | 3000 | 3300 | AUD |
| 376789590 | 6.12.2013 | 1000 | 2000 | 600 | USD |

T2

C1, C2 / SQL_3

| Currency / CompanyCode | 1000 | 2000 | 3000 |
|---|---|---|---|
| EUR | 1 | 1 | 1 |
| USD | 0 | 0 | N/A |
| AUD | 0 | 0 | 0 |

T2acc

| | F1 | f(F2) | F2 | F3 | F4 | F5 |
|---|---|---|---|---|---|---|
| | Document number | Year | Creation date | Company Code | Value | Currency |
| | 1234801 | 2016 | 1.1.2016 | 1000 | 500 | EUR |
| | 3480123 | 2016 | 31.12.2016 | 1000 | 300 | EUR |
| | 3231208 | 2016 | 5.7.2016 | 2000 | 7500 | USD |
| | 3108080432 | 2015 | 2.7.2015 | 1000 | 2300 | EUR |
| | 1032420 | 2014 | 6.2.2014 | 3000 | 7200 | EUR |
| | 1034789590 | 2014 | 6.10.2014 | 3000 | 4100 | AUD |
| | 36789590 | 2014 | 6.10.2014 | 2000 | 3300 | AUD |
| | 376789590 | 2013 | 6.12.2013 | 1000 | 600 | USD |

T1'

C3 = Year ~ f(F2)
C2 = CompanyCode ~ F3

| Year (f(F2))/ CompanyCode | 1000 | 2000 | 3000 |
|---|---|---|---|
| 2016 | x | x | N/A |
| 2015 | x | N/A | N/A |
| 2014 | N/A | x | x |
| 2013 | x | N/A | N/A |

T1i'

DUC_V1'

C3, C2 / SQL_4

| Year/CompanyCode | 1000 | 2000 | 3000 |
|---|---|---|---|
| 2016 | 0 | 1 | N/A |
| 2015 | 1 | N/A | N/A |
| 2014 | N/A | 1 | 1 |
| 2013 | 0 | N/A | N/A |

T1acc'

SQL_5:   SELECT ALL FROM T3 WHERE F4>1000

⬇

| F1 | F2 | F4 | F5 |
|---|---|---|---|
| 3231208 | 5.7.2016 | 7500 | USD |
| 3108080432 | 2.7.2015 | 2300 | EUR |
| 1032420 | 6.2.2014 | 7200 | EUR |
| 1034789590 | 6.10.2014 | 4100 | AUD |
| 36789590 | 6.10.2014 | 3300 | AUD |

SQL_5r

⬇

SQL_5a:   SELECT DISTINCT F3, F5
FROM T3 JOIN T4 ON T3~F1 = T4~F1' WHERE F4>1000

⬇

| F3 | F5 |
|---|---|
| 2000 | USD |
| 1000 | EUR |
| 3000 | EUR |
| 3000 | AUD |
| 2000 | AUD |

SQL_5ar

⬇

$\begin{bmatrix} \text{EUR, 1000} \\ \text{EUR, 3000} \\ \text{USD, 1000} \\ \text{USD, 2000} \\ \text{AUD, 2000} \\ \text{AUD, 3000} \end{bmatrix}$    
<---> CNT-1' = CNT-1' +1
<---> CNT-2' = CNT-2' +1
<---> CNT-3'
<---> CNT-4' = CNT-4' +1
<---> CNT-5' = CNT-5' +1
<---> CNT-6' = CNT-6' +1

FIG. 17

METHOD AND SYSTEM FOR DETERMINING DATA USAGE BEHAVIOR IN A DATABASE SYSTEM

CROSS-REFERENCE TO RELATED APPLICATION

This application claims priority to, and is a continuation of, EP16192248.9, filed on Oct. 4, 2016 and entitled "METHOD AND SYSTEM FOR DETERMINING DATA USAGE BEHAVIOR IN A DATABASE SYSTEM" the entirety of which is hereby incorporated by reference.

TECHNICAL FIELD

The present disclosure generally relates to electronic data processing, and more particularly, to methods, computer program products and systems for monitoring of data usage of data stored in databases.

BACKGROUND

Computer systems which, for example, are used by organizations to run their operations (e.g., Enterprise Resource Planning systems) or which collect large amounts of data for analytics purposes in the context of other applications, such as for example, traffic guidance systems, security systems, etc., typically store big amounts of data which are facing high numbers of data accesses to the stored data. The number of data accesses via respective queries to the respective database system(s) where the data is stored can impose a heavy load on the system and may negatively affect the performance of the system. Further, some data which is stored in the system may not be needed any more and unnecessarily consumes storage space in the respective databases. For optimizing the computer systems for improved performance and storage space it can be advantageous for the system designers to understand how the computer systems and/or respective database systems are used by the applications and/or users of the computer system(s). Currently the system designers can rely either on some partial statistics, asking samples of users about their usage behavior. However often users are not aware about the applications and/or data they actually use. Typically, system designers and application users lack a full understanding of the application usage.

A detailed view on the usage of data by applications/users may provide benefits to an IT organization, to run the application/database systems more efficiently.

SUMMARY

Understanding of the usage of enterprise resource planning systems can be beneficial for example in the context of testing—e.g., for testing more applications and data areas which are used frequently, application decommissioning—e.g., for decommissioning applications, which are not used, load tracking—e.g., determining which party/application is using the systems to which extent, data archiving—e.g., data which is rarely accessed may be archived, performance optimization—e.g., applications with high data access rate may be prioritized for optimization, authorization checks—e.g., for validating if users access the data they should, application usage—e.g., for identifying to which extent and why an application is used or not and to take corrective action to improve application usage Therefore, there is a need to improve tracking and analyzing data usage in computer systems for enabling IT system engineers to optimize computer systems with regards to performance and memory consumption.

This technical problem is solved by a computer system, a computer implemented method and a corresponding computer program for determining application access and usage behavior in a database system as disclosed in the independent claims. The disclosed inventive approach is based on algorithms which allow to generate data usage statistics with regard to data records complying with particular characteristics for data usage analysis. Thereby, the relationship between the characteristics and the table fields of one or more databases where the data (accessed by SQL queries) is stored is used to evaluate the SQL queries by comparing selection conditions of the SQL queries to the characteristics which are of interest for the data analysis. This results in the data usage statistics indicating how often data records with particular characteristics were used by the respective queries.

In one embodiment, a computer system is provided for determining application access and usage behavior in a database system. Thereby, an application uses a plurality of tables stored in at least one database system and each table includes one or more fields. The at least one database system can be accessed by using statements of the Structured Query Language (SQL). For example, the at least one database system can be a relational database system where SQL statements to read, insert, modify or delete data records stored in the tables of the database system.

The computer system has an interface component configured to receive, from one or more applications, a plurality of SQL queries. The SQL queries have data selection conditions to access data stored in the at least one database system. For example, a selection condition may relate to the data records stored in a particular table where the data records comply with the selection condition (e.g., all records from the particular table where the currency field includes the value "EUR"). Further, the interface component is configured to receive one or more characteristics wherein each characteristic relates to one or more respective fields. The received characteristics define the dimensions which are of interest for the analysis of the data usage behavior of applications or users. The characteristics may be received from a user of the system (e.g., a system engineer or system designer) or they may be received from an application.

For example, with regards to the optimization of a querying application in an Enterprise Resource Planning system the interesting dimensions (characteristics) for the data usage evaluation may be "company code" and "year". The "company code" relates to an identifier of a company which is stored with data records that are assigned to a respective company. The "year" may also be stored with the data records and may correspond to the year in which a particular data record was created. The received characteristics do not necessarily need to correspond to respective fields in the database system(s). Rather, different types of relationships between characteristics and fields may be used. For example, as in the previous example, a characteristic may correspond directly to a respective field. In one embodiment, the characteristics may relate to information which can be retrieved by transformation of a database field. For example, the database field may relate to a date whereas the characteristics of interest is the year. In this example, the characteristics relate to the field date but the year is extracted from the date field by a corresponding transformation. In one embodiment, one characteristic may relate to multiple fields of the database. For example, the dimension of interest may be "company code". In cases where transactions are recorded between two companies, the corresponding data records may include a field "company code from" and a further field "company code to". Both fields however are relevant when evaluating the number of accesses to data records with particular company codes because it may not matter whether the access occurred because the data record includes a particular company code in the "company code from" or the "company code to" field.

In general, a mapping between one or more characteristics and the one or more data fields may be implemented as: a 1:1 mapping where the characteristics relate to a single field with one or more field values associated with corresponding data usage categories, a n:1 mapping where the characteristics relate to multiple fields and each field having one or more field values associated with corresponding data usage categories, and/or a transformation mapping where the characteristics relate to a field whose transformed values are associated with the data usage categories. Transformation mappings may be implemented in different ways. In one example, a transformation mapping may result from a transformation function applied to a particular field value to generate a transformed value associated with a particular data usage category. In another example, a transformation mapping may be defined by a lookup table or lookup view which maps particular field values of a particular field to corresponding data usage categories.

Further, the computer system has a data storage component configured to store the received SQL queries. In one embodiment, the data storage may occur only during a predefined time interval which corresponds to the time period which is subject to the later data access analysis. For example, if the data accesses over the last three months are to be evaluated then the SQL queries which were run against the database(s) during this period of interest are stored. In one embodiment, the queries may be continuously received and stored in the data storage component. In this case, any arbitrary analysis period can be defined by simply selecting a particular time interval of interest for the following analysis.

The computer system further has an initialization component configured to determine one or more data usage categories wherein a data usage category has one or more characteristics values corresponding to one or more stored field values of the one or more respective fields. In other words, a data usage category may correspond to a specific value of a received characteristics which actually exists within the database system (i.e., there is at least one data record stored in the system with this specific value). In the case of multidimensional data usage analysis (i.e., a combination of a plurality of characteristics is used for the analysis), a data usage category corresponds to a specific vector of values.

Thereby, each vector relates to a combination of characteristic values which exists in at least one data record of the database system. For example, assuming that an application uses tables where data records are stored having a "company code" field and a "year" field. Assuming further, that a first company has the "company code" value "1000" and a second company in the system has the "company code" value "2000". For example, the first company code "1000" may exist in the system already since the year "2013" whereas the second company code "2000" was created in the year "2015". As a consequence, there may be data records in the system where a combination of "1000"/"2013" is stored. However, a combination of "2000"/"2013" does not exist. If the characteristics "company code" and "year" are defined as the dimensions of interest for the data access analysis the initialization component identifies all existing combinations of the respective field values in the stored data records. Such existing field value combinations can be accessed by the recorded queries and are referred to as data usage categories hereinafter. That is, the initialization component determines for the received characteristics the respective value combinations for which data records are stored in the database(s). As a consequence, value combinations for which no corresponding data records are determined as meaningful data usage categories and can be ignored because data access cannot occur to non-existing data records.

In one embodiment, the initialization component may determine the one or more data usage categories by applying an initialization SQL statement to the database system. The initialization SQL statement is configured to retrieve distinct field values of the one or more respective fields associated with the received one or more characteristics. The result is a list of vectors where each vector corresponding to a data usage category. Such a SELECT DISTINCT statement automatically eliminates all redundancies from the list so that each existing combination of characteristics values occurs once in the list of vectors.

The computer system further has a data usage analyzer component configured to analyze at least one of the stored SQL queries. This analysis includes comparing the data selection condition of the at least one stored SQL query with the determined one or more data usage categories.

If the data selection condition of the at least one stored SQL query indicates at least one query access to stored data including field values in accordance with a particular data usage category a data usage counter associated with the particular data usage category is incremented. Data usage counter may be instantiated for the determined data usage categories. Data usage counters for all potentially possible combinations of characteristics values would be a waste of computing resources.

It is to be noted that the execution of a particular SQL query causes a single access to the data records complying with the selection condition of the query. That is, for each query one access occurs to the respective data records in the database. In some embodiments, exactly one access occurs to the respective data records in the database. The data usage counter measures which data usage categories were affected by the database access of the particular SQL query.

The data usage counter values indicate the technical status of the database system in view of the querying applications with regards to the usage of data records stored therein. This technical status information may provide useful information to the system engineer/designer who intends to optimize the applications/database system(s) based on the measured data usage behavior.

In one embodiment, the interface component may further include a user interface to interact with such user. For example, the user interface may provide display means configured to prompt the user with the data usage counter values associated with the respective data use categories to initiate a corrective action in response to the measured data usage behavior. For example, the user may initiate the deletion of data records belonging to a particular data usage category from the database system if the corresponding data usage counter indicates no use of the data at all. This frees up memory and may also positively affect the system performance. For example, the user may initiate the respective data in an archiving system, if the data usage counter is below a high data use threshold value. Again, memory space is freed up and system performance is improved. For example, the user may initiate the generation of test cases for a corresponding application, if the data usage counter is equal or above the high data use threshold value. High data usage counter values indicating frequent access to the respective data records may provide a good indicator for prioritizing optimization actions for further system performance improvement.

In one embodiment, the data usage analyzer component can compare the data selection condition of a particular SQL query with the one or more data usage categories by adjusting the particular SQL query in that the particular SQL query is transformed into a SQL statement being adapted to retrieve distinct field values of the one or more respective fields associated with the received one or more characteristics while maintaining the remainder (e.g., the rest) of the selection condition of the particular SQL query. The adjusted SQL query is then applied to the database. The result is a list of vectors corresponding to such data usage categories which were used (e.g., read, insert, modify, or delete access) by the particular SQL query at the time it was executed. That is, the adjustment of the original SQL query into a select distinct statement allows to retrieve in one shot all data usage categories which were affected by the original query when accessing the database. Therefore, no tedious analysis of the query hits of the original SQL query is to be carried out. The data usage analyzer component may then increment a particular data usage counter if the application of the adjusted SQL query results in one or more hits for the associated data usage category. That is, the data usage counters associated with the data usage categories which correspond the result of the adjusted SQL query are incremented by one. As a result, at this point in time, each data usage counter includes the counter value which reflects the usage of data falling under the respective data usage category caused by the original SQL query and previously analyzed SQL queries.

In one embodiment, the analyzer component may analyze all SQL queries stored during a particular time interval. In one embodiment, the analyzer component may analyze subsets of the stored queries. In one embodiment, the analyzer component may analyze only subsets of the stored queries. Such subsets may relate to queries grouped by application and/or by user. For this latter embodiment, the data storage component can store the received SQL queries together with a respective querying application identifier and/or a respective querying user identifier. The data usage analyzer component may then analyze subsets of the stored SQL queries wherein the subsets are grouped by the respective application identifiers and/or user identifiers.

In one embodiment, a computer-implemented method for determining data usage behavior in at least one database system is provided. The method may be executed by the previously disclosed computer system and the provided method steps may be executed by the corresponding components of the computer system as disclosed above. Thereby, an application uses a plurality of tables stored in the at least one database system and a table includes a plurality of fields. The method allows to analyze data records stored in corresponding table fields of the database(s) where SQL queries were used to access particular data records in accordance with data selection conditions defined by the SQL queries. The method includes receiving, from one or more applications, a plurality of SQL queries wherein the SQL queries have data selection conditions to access data stored in the database system, storing the received SQL queries; receiving one or more characteristics (for data usage analysis) wherein each characteristic relates to one or more respective fields, determining one or more data usage categories wherein a data usage category has one or more characteristics values corresponding to one or more stored field values of the one or more respective fields, comparing the data selection condition of at least one stored SQL query with the determined one or more data usage categories, and incrementing a data usage counter associated with a particular data usage category if the data selection condition of the at least one stored SQL query indicates at least one query access to stored data including field values in accordance with the particular data usage category.

In one embodiment, the step determining one or more data usage categories may further include applying an initialization SQL statement to the database system, the initialization SQL statement being configured to retrieve distinct field values the one or more respective fields associated with the received one or more characteristics resulting in a list of vectors with each vector corresponding to a data usage category.

In one embodiment, the step comparing the data selection condition of at least one stored SQL query with the one or more data usage categories may further include: adjusting the particular SQL query in that the particular SQL query is transformed into a SQL statement being adapted to retrieve distinct field values of the one or more respective fields associated with the received one or more characteristics while maintaining the remainder (e.g., the rest) of the selection condition of the particular SQL query, and applying the adjusted SQL query to the database. The step incrementing a data usage counter may the further include incrementing a particular data usage counter if the application of the adjusted SQL query results in at least one hit for the associated data usage category.

The method may be used to prompt a user with the data usage counter values associated with the respective data usage categories. In other words, the user is prompted with information indicating the internal state of the computer system with regards to the data usage by previously executed SQL queries. This information supports the user in initiating corrective actions if the counter values provide corresponding indications. For example, the user may initiate deletion of the respective data from the database system, if the data use counter indicates no use of data, or initiate archiving the respective data in an archiving system, if the data use counter is below a high data use threshold value, or initiate the generation of test cases from data for a corresponding application, if the data use counter is equal or above the high data use threshold value.

In one embodiment, the method stores the received SQL queries with a respective querying application identifier and/or a respective querying user identifier. This allows to perform the comparing and incrementing steps for subsets of the stored SQL queries which may be grouped by application identifier and/or user identifier. This feature allows analysis of data usage behavior with higher granularity in that the tracking can be performed at the application level or even at the user level. That is, the user receives information at this level of granularity which allows to optimize the performance/memory consumption of the computer system/database(s) for very specific data usage scenarios which could otherwise not be identified/detected.

In one embodiment, a computer program product for determining data usage behavior in a database system is provided. The computer program product has instructions that when loaded into a memory of a computing device and executed by at least one processor of the computing device executes the steps of the above disclosed computer-implemented method and the above disclosed features of the computer system.

Further aspects of the present disclosure will be realized and attained by means of the elements and combinations particularly depicted in the appended claims. It is to be understood that both, the foregoing general description and the following detailed description are exemplary and explanatory only and are not restrictive of the present disclosure as described.

BRIEF DESCRIPTION OF THE DRAWINGS

FIG. 3 illustrates an example of a first database table with data records.

FIG. 4 illustrates an example for determining data usage categories with regards to the first database table and two characteristics.

FIG. 17. illustrates an example of determining, for a fifth query, data usage with regards to the two characteristics applied to the joined database tables.

DETAILED DESCRIPTION

Figure 1:
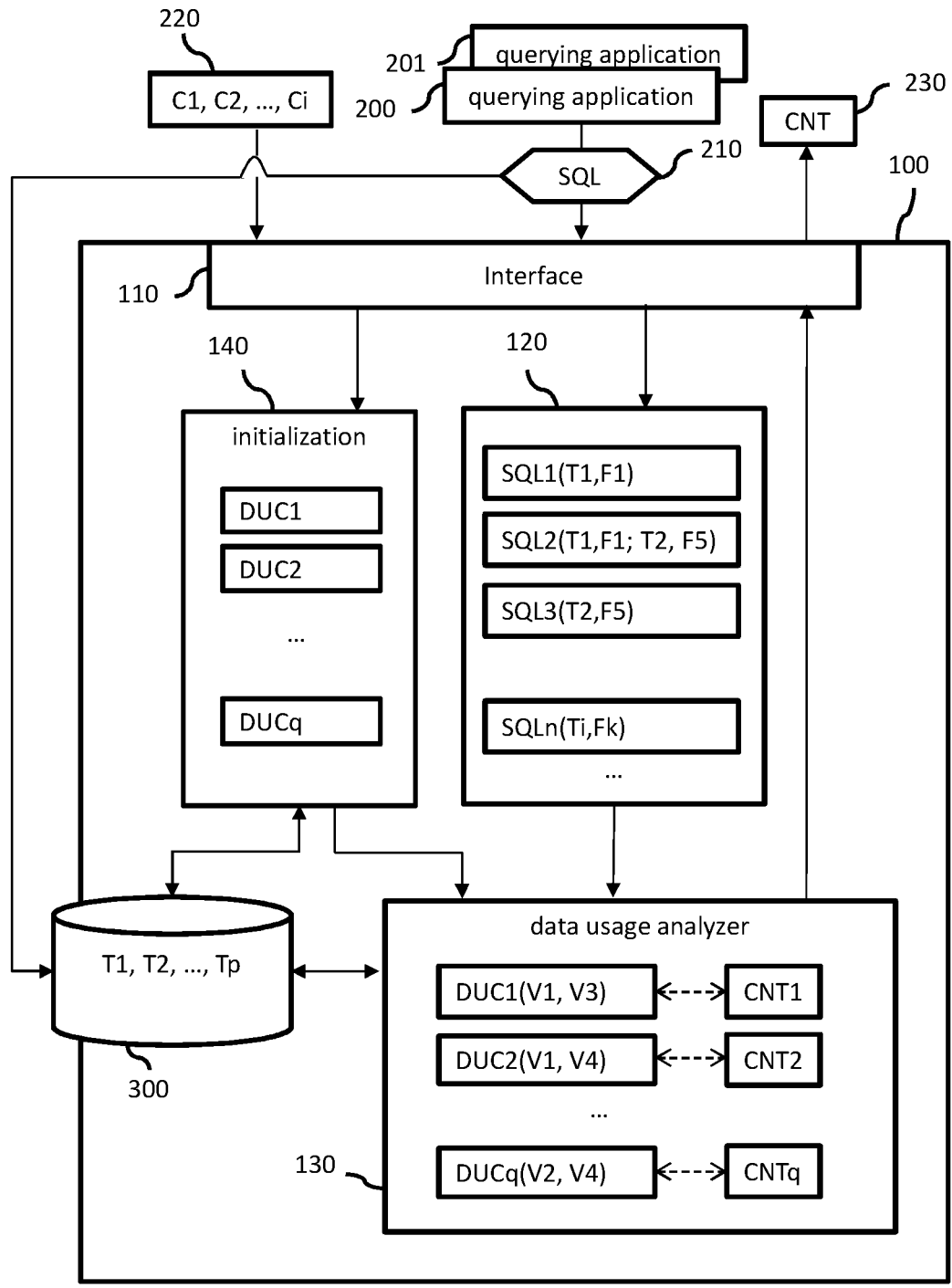
FIG. 1 is a simplified block diagram illustrating a computer system for determining data usage behavior in a database system according to an embodiment of the present disclosure.
Figure 2:
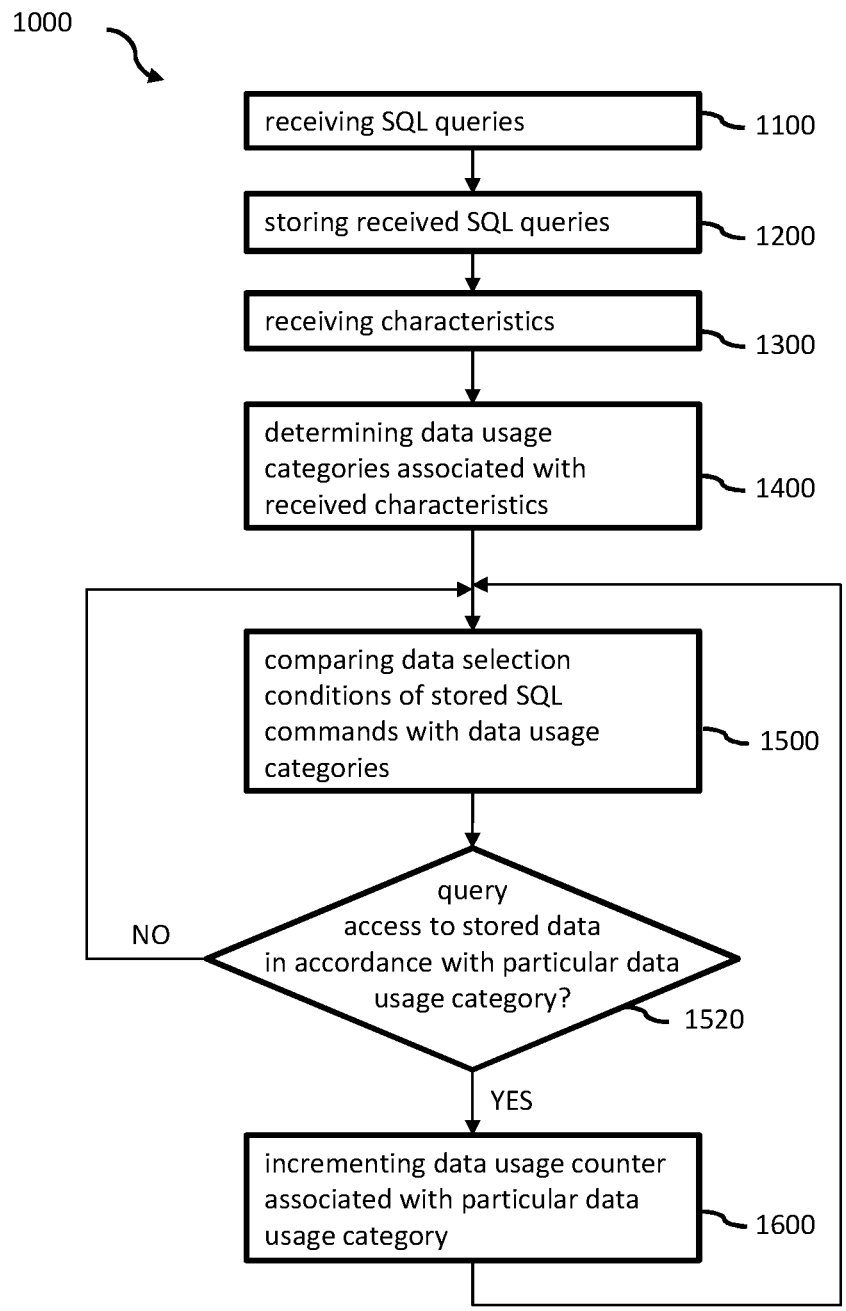
FIG. 2 is a simplified flowchart of a computer-implemented method for determining data usage behavior in a database 3 illustrates system according to an embodiment of the present disclosure.

FIG. 1 is a simplified block diagram illustrating a computer system 100 for determining data usage behavior in at least one database systems 300 according to an embodiment of the present disclosure. The computer system 100 can be operated to execute a computer-implemented method 1000 illustrated by the simplified flowchart of FIG. 2. The description of FIG. 1 is written in view of the flowchart in FIG. 2 and reference numbers may refer to FIG. 1 or to FIG. 2, accordingly.

In the embodiment of FIG. 1, the computer system 100 has an interface component 110 which allows communicative coupling of the computer system 100 with other entities. Any standard interface technology suitable for the exchange of data, including but not limited to machine-to-machine interfaces, Input/Output (I/O) means for user interaction, etc., may be used for this purpose. The interface 110 can receive 1100 SQL queries 210 which are launched by corresponding applications 200, 201 against the at least one database 300. For example, the at least one database 300 can be external to the computer system 100 or it may be an integral part of the computer system 100. In one embodiment, the system 100 may be implemented as an integrated component of the at least one database 300. In the example, the at least one database 300 includes the database tables T1 to Tp where each of the tables may include different or same fields.

When a querying application 200, 201 runs a SQL query against the database(s) 300, the SQL query is also received 1100 via the interface 110 and stored 1200 in the data storage component 120. Other storage technology may be used which is appropriate to persist the received SQL query statements. In the example of FIG. 1, the storage component 120 stores the SQL queries SQL1 to SQLn. The stored queries may have different selection conditions referring to different database tables and different fields. In the example, the query SQL1 has a selection condition related to table T1 and field F1. The query SQL2 has a selection condition related to the table T1 and field F1 and to table T2 and field F5, and so on. That is, at the time a particular SQL query is executed in the at least one database it accesses data stored in the database 300 in accordance with its selection condition.

Further, the interface 110 receives 1300 one or more characteristics 220 wherein each characteristic C1 to Cj relates to one or more respective fields. The characteristics define dimensions of interest for the data usage analysis regarding the data usage of the stored data by the various queries 210. The characteristics 220 may be received 1300 via an appropriate user interface from a user of the system 100 who intends to use the results of the data usage analysis, for example, to optimize the querying applications 200, 201 and/or database 300 with regards to application performance and/or memory consumption. Alternatively, the characteristics may be provided to the interface 110 by a further software application (e.g., a software application for generating test cases for performance optimization).

In one embodiment, each one of the characteristics C1 to Ci may be mapped directly to a corresponding database field. For example, if the interest of the data usage analysis with regards to a table storing data about financial transactions is on the dimensions "company code" and "currency" and if these characteristics can be found as fields in the database 300, a corresponding 1:1 mapping can be used. In a more complex embodiment, a particular characteristic may relate to more than one field in the database. Such a data usage analyzer mapping scenario is explained in detail in the context of FIGS. 8 to 11. In some embodiments, transformation mappings may be used where characteristics relate to a transformation of a one or more database fields. Scenarios with transformation mappings are described in more detail in the context of FIGS. 12 to 17.

The initialization component 140 determines 1400 one or more data usage categories DUC1 to DUCq for the analysis based on the received characteristics. Thereby, a data usage category has one or more characteristics values corresponding to one or more stored field values of one or more respective fields which are mapped to the characteristics. In other words, a data usage category corresponds to a particular value of one or more characteristics or to a particular combination of values of the received characteristics which actually exist in the database. Coming back to the previous example of using the characteristics "company code" and "currency" and making the assumption that a 1:1 mapping exists to respective data base fields, there may exist many "company code" values in the database and there may exist many "currency values" in the database. However, not each possible combination is needed as data usage category. Queries can generally access stored data records. That is, only the combination of characteristics values which are actually present in at least one data record can be relevant data usage categories. A combination of a "company code" "3000" with a "currency" "AUD" may not lead to a data usage category if no data record in the database includes such field values in the mapped fields.

In one embodiment, the initialization component 140 may determine the one or more data usage categories DUC1 to DUCq by applying an initialization SQL statement to the database system 300, with the initialization SQL statement being configured to retrieve distinct field values of the one or more respective fields associated with the received one or more characteristics 220. This results in a list of vectors without redundancies with each vector corresponding to a data usage category. The detailed embodiments described in FIGS. 3 to 17 illustrate the initialization of data usage categories for the various mapping options between characteristics and database fields.

The data usage analyzer component 130 analyzes at least one of the stored SQL queries SQL1 to SQLn. For a data usage analysis across all queries stored during a particular time interval, the analysis steps are performed for each query. However, the analysis may be restricted to subsets of the stored queries. For example, it may analyze queries coming from a particular application and/or a particular user. The subset function is enabled if the queries are stored together with respective identifier information indicating the querying application/user.

The analyzer component 130 compares 1500 the data selection condition of the at least one stored SQL query with the determined one or more data usage categories DUC1 to DUCq; in order to determine which data usage categories were affected by the respective query when it was executed in the database 300. Comparing 1500 in this context is to be understood as any operation which allows to identify if the execution of the query caused an access to at least one data record with field values corresponding to any one of the determined data usage categories. For example, a modified query based on the original query but restricted to the respective data usage category could be executed for each data usage category. If there is at least one hit (comparison 1520) then the respective data usage category would have been affected by the original query. In such cases, where the data selection condition of the at least one stored SQL query indicates at least one query access to stored data including field values in accordance with a particular data usage category, a data usage counter CNT1 to CNTq associated with the particular data usage category DUC1 to DUCq is incremented. The values of the data usage counters after the analysis of the queries of interest reflect the data usage behavior in the database 300.

However, this embodiment would include the execution of q queries (one per data usage category) for each of the stored queries, thus generating additional system load and causing long system run times caused by the analysis component. In one embodiment, this problem is solved in a convenient way. In this embodiment, the data usage analyzer component 130 compares 1500 the data selection condition of a particular SQL query with the one or more data usage categories DUC1 to DUCq by adjusting the particular SQL query in that the particular SQL query is transformed into a SQL statement being adapted to retrieve distinct field values of the one or more respective fields associated with the received one or more characteristics 220. When adjusting the select statement into a select distinct statement the rest of the selection condition of the particular SQL query is maintained. This adjusted SQL query is then applied to the database 300. The result of the adjusted query is a non-redundant list of vectors which corresponds to all data usage categories affected by the original query. That is, a single query can be executed by the analyzer component without further filtering or other analysis. The immediate result for the adjusted query can be used by the data usage analyzer component 130 to increment 1600 the data usage counters associated with identified data usage categories. The result of the adjusted select distinct statement automatically indicates all data usage categories for which at least one data record was touched by the original query when it was executed. This embodiment of the analyzer component causes a much lower load to the database system than any usage behavior analysis method known from the prior art and further allows a detailed view on data usage with regards to particular field values or combinations of field values. In the prior art, data usage analysis is typically restricted to measuring query access quantities to a table or to a certain field, but not with regards to particular data usage categories at a data record level.

In one embodiment, the interface component 110 may provide display means to prompt a user with the data usage counter values 230 associated with the respective data use categories DUC1 to DUCq to initiate a corrective action. Such corrective actions may include but are not limited to: deletion of the respective data from the database system 300, if the data usage counter indicates no use of data; archiving the respective data in an archiving system, if the data usage counter is below a high data use threshold value; or generating test cases from data for a corresponding application, if the data usage counter is equal or above the high data use threshold value.

The following examples illustrate different embodiments of the present disclosure related to different mapping types used for the mapping between the received characteristics and related fields in the database. The first mapping example relates to a 1:1 mapping and is disclosed in FIGS. 3 to 7.

FIG. 3 illustrates an example of a first database table T1 with fields F1 to F5. The contents of the data records of T1 correspond to the respective field values of the fields F1 to F5. The example data records include a document number in F1, a creation date (of the data record) in F2, a company code (for identifying a company) in F3, a value (e.g. an invoice amount) in F4, and a currency (currency code) in F5.

FIG. 4 illustrates an example for determining data usage categories DUC_V1 with regards to the first database table T1 and two characteristics C1=Currency and C2= CompanyCode. That is, the following data usage analysis intends to identify for particular queries which data usage categories were accessed by the respective queries when they were executed. The characteristics C1 and C2 relate directly to the fields F5 and F3, respectively. Table T1*i* shows the result of the determination of data usage categories during the initialization. It shows the existing combinations of field values in the data records for the fields F5, F3 which are mapped to the characteristics C1, C2. The mapping may be defined in a corresponding data structure (e.g., with tables, pointers, or other mapping mechanisms). Typically, such a data structure is part of the customizable part of a computer system where the respective mappings are defined and stored. For the combinations "EUR, 2000", "USD, 3000", "AUD, 1000" no data records exist in T1. Therefore, these combinations are shown as "N/A" in the initialization table T1*i* because they are not possible data usage categories. The "N/A" notation is used for visualization purpose only. The result of the initialization is the list DUC_V1 of vectors V1 to V6 where each vector corresponds to a determined data usage category. As can be seen, the list of vectors includes vectors which reflect combinations of characteristics values for which data records are stored. The "N/A" related combination do not appear as vectors. In some embodiments, the list of vectors only includes vectors which reflect combinations of characteristics values for which data records are stored. The "N/A" related combination do not appear as vectors.

Figure 5:
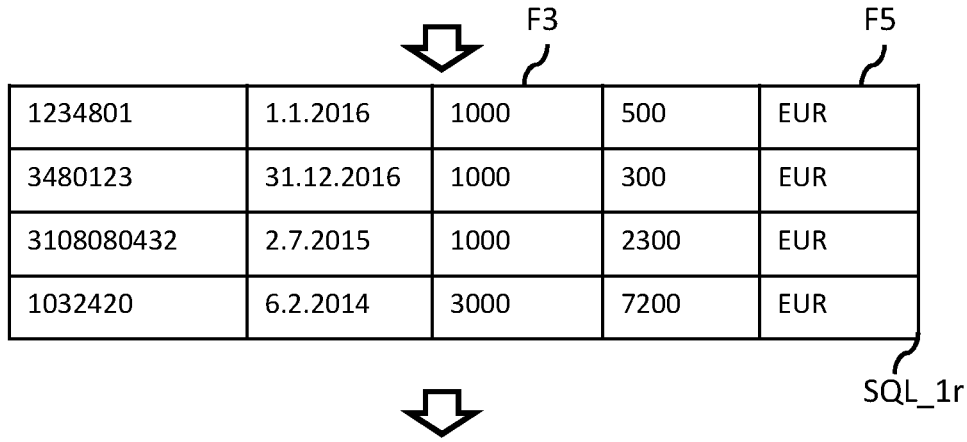
FIG. 5 illustrates an example of determining, for a first query, data usage with regards to the two characteristics.
Figure 5:
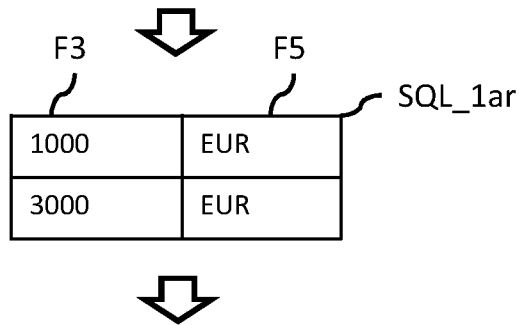
Figure 5:
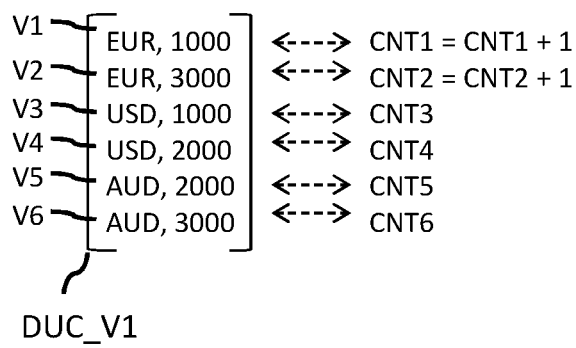

FIG. 5 illustrates an example of determining, for a first querySQL_1, data usage with regards to the two characteristics C1, C2. Table SQL_1*r* shows the result which was delivered when query SQL_1: SELECT ALL FROM T1 WHERE F5=EUR was run against the database table T1. In one embodiment, instead of T1 also a join of two tables can be used. In the example, particular data records were delivered which comply with the selection condition "FROM T1 WHERE F5=EUR" of the query SQL_1. In the example embodiment, based on the stored query SQL_1, the adjusted query SQL_1*a* is generated. Thereby, SELECT ALL is transformed into a SELECT DISTINCT statement in relation to the fields F5, F3 (which are mapped to the characteristics C1, C2) resulting in "SELECT DISTINCT F3, F5". The rest of the selection condition of SQL_1 is maintained: "FROM T1 WHERE F5=EUR". The table SQL_1*ar* shows the result of the adjusted query SQL_1*a* when applied to the database table T1. It includes two vectors ("EUR, 1000", "EUR, 3000" in the mapped fields F5, F3) which correspond to the data usage categories V1 and V2. That is, when the query SQL_1 was originally executed it caused access to data records belonging to such two data usage categories. As a consequence, the data usage counters CNT1 and CNT2 associated with the data usage categories V1, V2 are incremented. The other data usage counters CNT3 to CNT6 remain unchanged.

Figure 6:
FIG. 6 illustrates an example of determining, for a second query, data usage with regards to the two characteristics.
Figure 6:
Figure 6:
Figure 6:

FIG. 6 illustrates an example of determining, for a second query SQL_2, data usage with regards to the two characteristics C1, C2. The second query SQL_2 has the selection condition "FROM T1 WHERE F3=1000" in relation to the company code and provided the data records shown in table SQL_2*r*. The stored query SQL_2 is transformed into the adjusted query SQL_2*a*: SELECT DISTINCT F3, F5 FROM T1 WHERE F3=1000. The result shown in table SQL_2*ar* includes the two vectors "EUR, 1000", "USD, 1000" which correspond to the data usage categories V1 and V3. As a consequence, the associated data usage counters CNT1 and CNT3 are incremented.

Figure 7:
FIG. 7 is a matrix illustrating cumulative data usage for the first database table for various data usage categories in relation to the two characteristics.

FIG. 7 shows a matrix T1*acc* illustrating cumulative data usage for the first database table T1 for various data usage categories in relation to the two characteristics Currency and CompanyCode after the queries SQL_1 and SQL_2 have been analyzed. It is assumed that the data usage counters are initialized with the value 0 when they are instantiated for the respective data usage categories. The matrix shows that data records belonging to the data usage category "EUR, 1000" were accessed by two queries whereas data records belonging to the data usage categories "USD, 1000" and "EUR, 3000" were accessed by one query. In some embodiments, the matrix shows that data records belonging to the data usage category "EUR, 1000" were accessed by two queries whereas data records belonging to the data usage categories "USD, 1000" and "EUR, 3000" were only accessed by one query In case where the queries SQL_1 and SQL_2 are stored with the same application identifier or with the same user identifier, the measured data usage behavior can be related to the respective querying application or user.

Figures 8, 9:
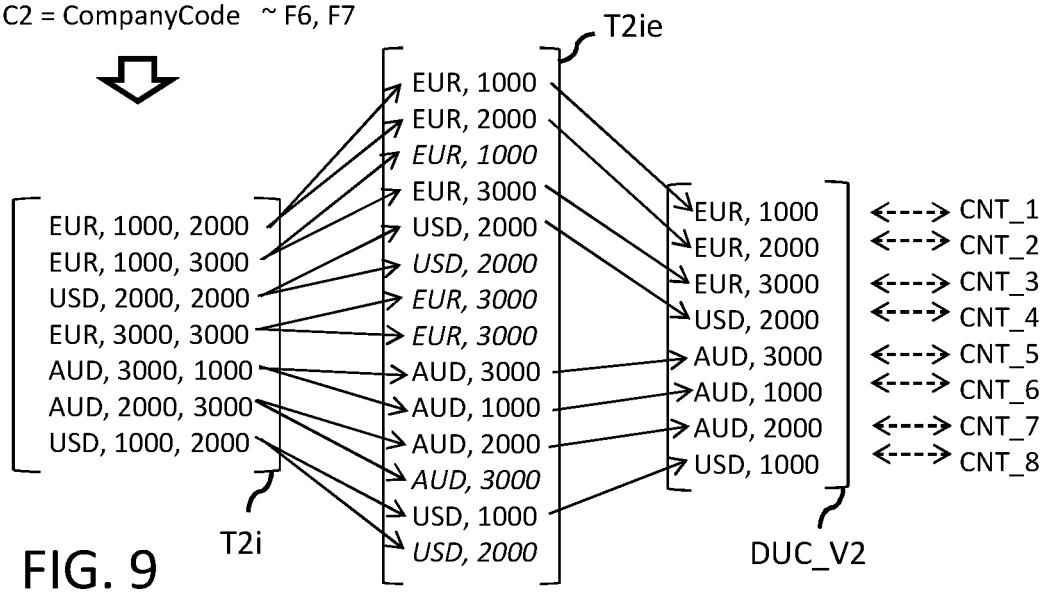
FIG. 8 illustrates an example of a second database table with data records.
FIG. 9 illustrates an example for determining data usage categories with regards to the second database table and two characteristics including multiple field relations.

For the 1:1 mapping scenario the algorithm for determining the data usage behavior can be described by the following pseudo code. For each selected stored SQL query
 Get FROM part & WHERE condition from stored SQL query
 Generate adjusted query:
 SELECT DISTINCT F1, F2, . . . Fn FROM (same as before) WHERE (same as before)
 (result: m vectors of F1, F2 . . . Fn)
 For each vector
  add 1 to the counter associated with the corresponding data usage category
 end For
end For The second mapping example relates to a 1:n mapping and is disclosed in FIGS. 8 to 11. FIG. 8 illustrates an example of a second database table T2 which is similar to the first database table T1 but instead of having a single company code field F3 the table T2 has two fields F6, F7 which both relate to company codes (CompanyCode_from, CompanyCode_to). For example, the data records may be financial transactions between two companies and the field F6 may correspond to the company initiating a payment whereas the field F7 may correspond to the company receiving the payment. When the data usage analysis wants to evaluate data access to data records using a particular company code it does not matter whether the company code appears in field F6 or F7.

Therefore, in the scenario shown in FIG. 9, the characteristics C2 (CompanyCode) relates to the two fields F6, F7 whereas the characteristics C1 again directly relates to the currency field F5. FIG. 9 further illustrates an example for determining data usage categories DUC_V2 with regards to the database table T2. The determination of the data usage categories is more complex in 1:n mappings. In a first step, an initialization matrix T2*i* is determined which includes all distinct vectors related to the mapped fields F5, F6, F7. That is, such value combinations are listed in the matrix T2*i* for which at least one data record exists in table T2. The matrix T2*i* is then expanded into an expanded initialization matrix T2*ie* where each horizontal vector of T2*i* is broken down into two break down vectors. In other words, each initialization vector of T2*i* includes one value for the characteristic C1 and two values (mapped fields F6, F7) for the characteristic C2. In general, a break down vector, as used herein, is a vector which is generated based on a vector of the original initialization matrix in a 1:n mapping scenario in such a way that for each of then values of a multiple field characteristic (e.g., C2) a break down vector is generated including the respective value in combination with the remaining values of the other characteristics of the initialization vector. The first break down vector corresponds to the F5-F6 combinations and the second break down vector corresponds to the F5-F7 combinations. In general, the number of break down vectors in the expanded initialization matrix depends on the mapping ratio. If C2 would relate to three fields than each vector would be broken down into three vectors. If, in addition, C1 would relate to two fields then the number of break down vectors would be 2×3=6. The break down vectors of T2*ie* still include redundancies (shown in italics) which need to be eliminated to arrive at the final list DUC_V2 of data usage categories. At this stage, the data usage counters CNT_1 to CNT_8 associated with the respective data usage categories can be instantiated.

Figure 10:
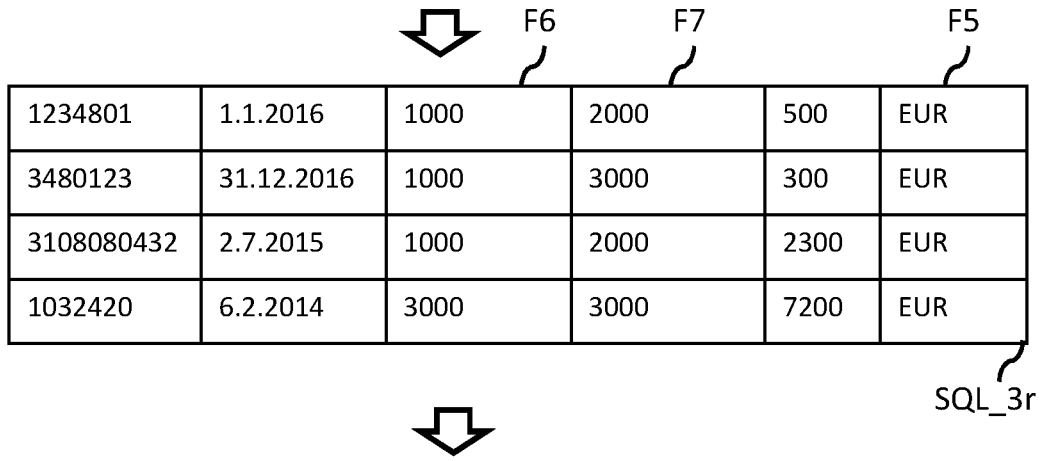
FIG. 10 illustrates an example of determining, for a third query, data usage with regards to the two characteristics including the multiple field relations.
Figure 10:
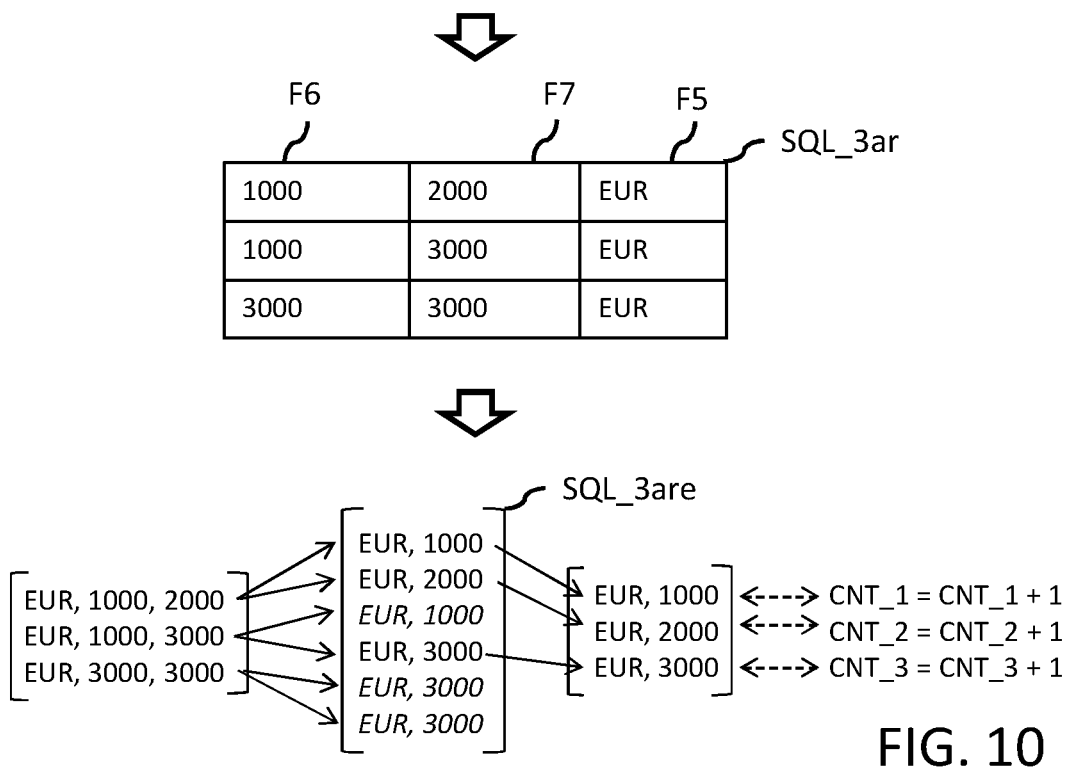

FIG. 10 illustrates an example of determining, for a third query SQL_3, data usage with regards to the two characteristics CI, C2 including the multiple field relations (C2→F6, F7). The data records provided by the query SQL_3: SELECT ALL FROM T2 WHERE F5=EUR at the time it was executed are shown in the result table SQL_3*r*. To determine the data usage with regards to the characteristics Currency and CompanyCode the adjusted query SQL_3*a*: SELECT DISTINCT F6, F7, F5 FROM T2 WHERE F5=EUR is generated. In the 1:n mapping scenario all related fields F6, F7, F5 form part of the SELECT DISTINCT condition in the adjusted query. The result SQL_3*ar* of the query SQL_3*a* (when applied to T2) includes the distinct combinations of values for the related fields F6, 76, F5 which exist in the data records of T2 which comply with the selection condition of SQL_3. The following step corresponds to the generation of break down vectors in the initialization matrix. The vectors of the result SQL_3*ar* are expanded by breaking down the horizontal vectors of the result as shown in the expanded results SQL_3*are*. Again, from the list of break down vectors the redundancies are eliminate. This leads to the data usage categories "EUR, 1000", "EUR, 2000", "EUR, 3000" for which the respective data usage counters CNT_1, CNT_2, CNT_3 are incremented.

Figure 11:
FIG. 11 is a matrix illustrating data usage caused by the third query for the second database table for various data usage categories in relation to the two characteristics including the multiple field relations.

FIG. 11 shows the matrix T2*acc* illustrating data usage caused by the query SQL_3 for the database table T2 for various data usage categories in relation to the two characteristics C1, C2 including the multiple field relations F5, F6, F7. The query SQL_3 caused access to data records belonging to the data usage categories of the EUR row and, therefore, the corresponding counters were incremented.

For the 1:n mapping scenario the algorithm for determining the data usage behavior can be described by the following pseudo code:

Let Fr1 to Frn be the fields which are related to a single characteristics C. Let k be the number of all related fields.

```
For each selected stored SQL query
    Get FROM part & WHERE condition from stored SQL query
    Generate adjusted query:
    SELECT DISTINCT Fr1, . . . , Frn, . . . Fk FROM
    (same as before) where (same as before)
    (result: m vectors of Fr1, . . . , Frn, . . . Fk )
```

```
For each vector
    create n break down vectors
end For
eliminate redundant breakdown vectors
    add 1 to the counter associated with the corresponding data
    usage category
For each remaining break down vector
    add 1 to the associated data usage counters
end For
end For
```

Figures 12, 13:
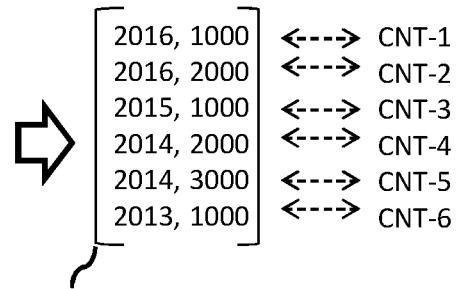
FIG. 12 illustrates an example of a third database table with data records.
FIG. 13 illustrates an example for determining data usage categories with regards to the third database table and two characteristics including a transformation.

The third mapping example relates to a transformation mapping using a transformation function and is disclosed in FIGS. 12 to 15. FIG. 12 illustrates an example of a database table T1' with data which substantially corresponds to table T1 of FIG. 3 but has an additional (virtual) column f(F2). This column does not represent a field of T1' but shows the result of the transformation function f when is applied to the field column F2. The transformation function f is a function which derives the respective years from dates stored in F2.

FIG. 13 illustrates an example for determining data usage categories with regards to the table T1' and the two characteristics C3="Year" and "C2=CompanyCode". Thereby, C2 relates directly to the field F3. However, there is no field in table T1' which directly relates to C3. Nevertheless, F2 can serve as the basis for the year characteristics because it includes the information which can be retrieved from F2 by using the transformation function f. The initialization matrix T1*i*' illustrated determined data usage categories for the characteristics C3, C2 resulting in the list DUC_V1' of data usage categories associated with the respective counters CNT-1 to CNT-6.

Figure 14:
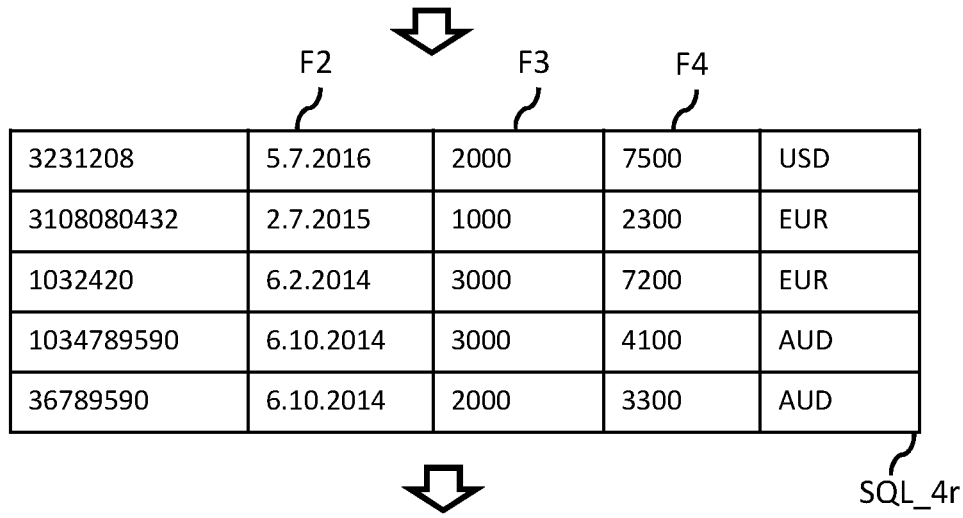
FIG. 14 illustrates an example of determining, for a fourth query, data usage with regards to the two characteristics including the transformation.
Figure 14:
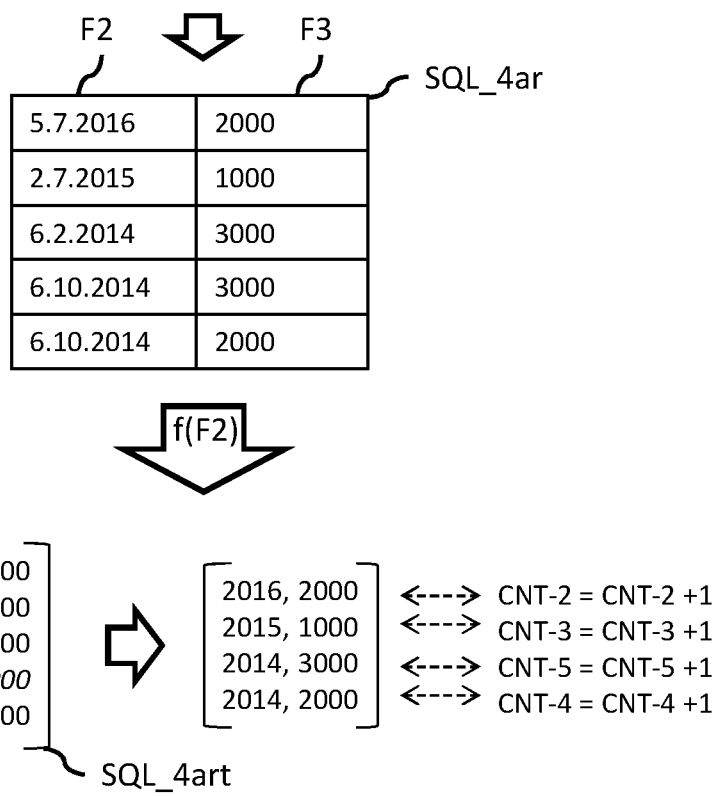
Figure 15:
FIG. 15 is a matrix illustrating data usage caused by the fourth query for the third database table for various data usage categories in relation to the two characteristics including the transformation.

FIG. 14 illustrates an example of determining, for a fourth query SQL_4, data usage with regards to the two characteristics where C3 relates to F2 via the transformation function f. The result SQL_4*r* was provided when the query SQL_4 SELECT ALL FROM T1 WHERE F4>1000 was executed. The adjusted query SQL_4*a*: SELECT DISTINCT F2, F3 FROM T1 WHERE F4>1000 includes the field F2 and not the transformation because the transformation is not an existing field in table T1' which could be queried. Therefore, the result SQL_4*ar* is still including the date values from field F2. The transformation function f is then applied to the F2 column of the result SQL_4*ar* resulting in the transformed result SQL_4*art*. Through the transformation new redundancies may be introduced, which are eliminated to lead to the data usage categories being associated with the counters CNT-2 to CNT-5. Such data usage counters are incremented. The counters now reflect the status of the data usage in the database caused by the execution of the query SQL_4 for the characteristics "Year" and "CompanyCode". Although the system does not directly store the information which data records belong to a certain year and a certain company code the transformation function allows to generate such data usage information as long as there are one or more fields in the database from which the characteristics of interest can be derived. The data usage status after the analysis of the stored query SQL_4 is illustrated in matrix T1*acc*' of FIG. 15.

For the transformation mapping scenario with a transformation function the algorithm for determining the data usage behavior can be described by the following pseudo code:

Let Ft, F1 to Fn be the fields which are related to corresponding characteristics Ci where Ft is a field which needs to be transformed to match a corresponding characteristics.

```
For each selected stored SQL query
    Get FROM part & WHERE condition from stored SQL query
    Generate adjusted query:
        SELECT DISTINCT Ft, F1, . . . , Fn FROM (same as before)
        where (same as before)
        (result: m vectors of Ft, F1, . . . , Fn)
        For each vector
            apply transformation function f to Ft and create 1:1
            mapping between f(F1t)
            and respective characteristics
        end For
        eliminate redundant transformed vectors
        For each remaining transformed vector
            add 1 to the counter associated with the corresponding
            data usage category
        end For
    end For
```

Figure 16:
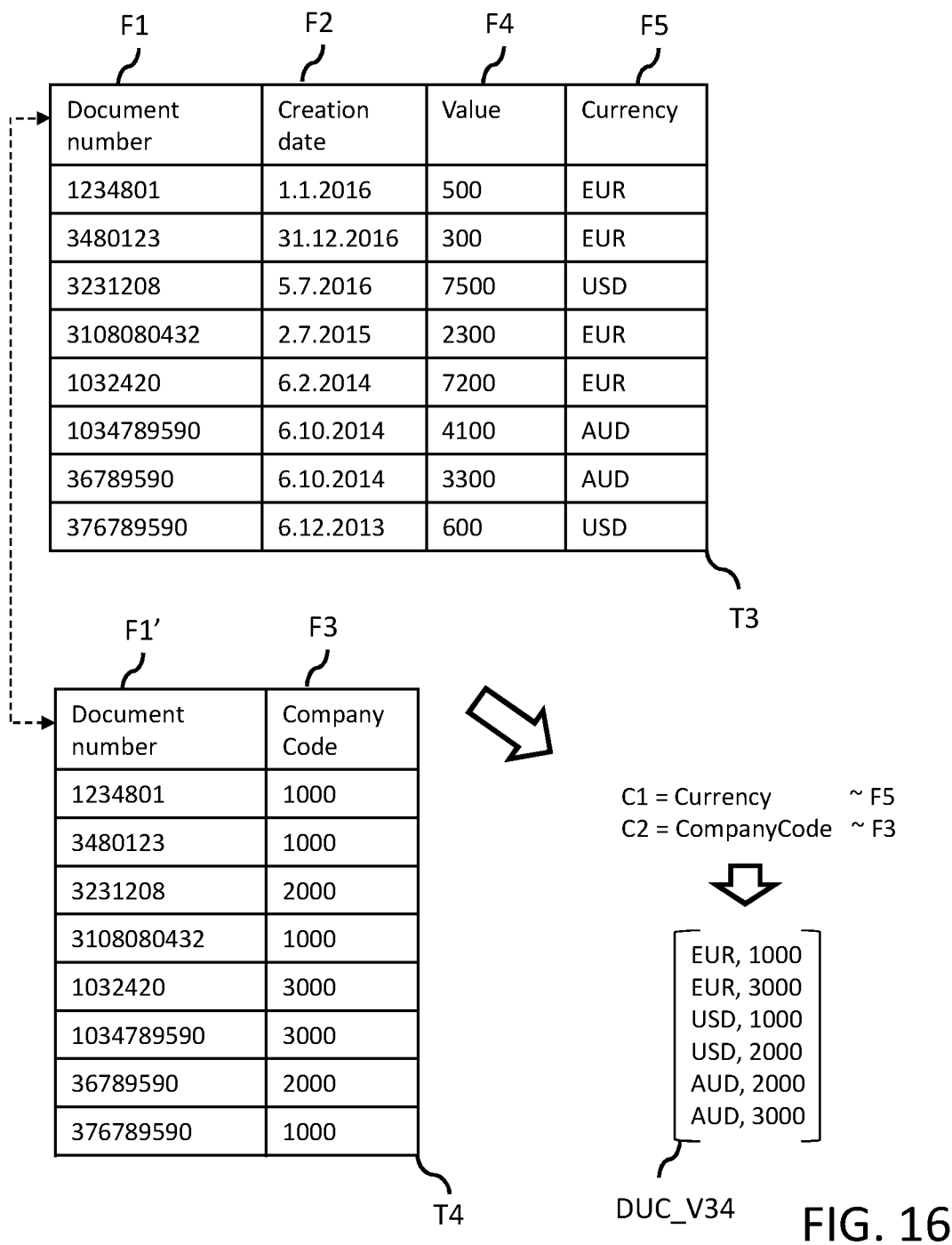
FIG. 16 illustrates an example of a fourth and a joined fifth database table with data records, and corresponding data usage categories for two characteristics.

The fourth mapping example relates to a transformation mapping using a join transformation and is disclosed in FIGS. 16 and 17. FIG. 16 illustrates an example of database table T3 and joined database table T4 with data records, and corresponding data usage categories for two characteristics. In this example, the dimensions of interest are the characteristics C1 "Currency" and C2 "CompanyCode" C1 is directly related to F5 of T3. However, T3 does not include information regarding C2. In the example, a further database table T4 includes the information about the company code F3 associated with each document number in F1'. T4 may already exist, or it may be dynamically generated to provide the information in table T3 but utilized for the data usage analysis in view of C1, C2. The document numbers in F1' of T4 correspond to the document numbers in F1 of T3. Therefore, the system can join (dashed arrow) the tables T3 and T4 via the keys F1 and F1'. As a result of the initialization using the joined tables T3 and T4 the list DUC_V34 of data usage categories is generated. The result corresponds to the initialization result DUC_V1 of FIG. 4 because the joined tables T3 and T4 provide the same information like the data records of T1 in FIG. 3.

FIG. 17 illustrates an example of determining, for a fifth query SQL_5, data usage with regards to the two characteristics where C1, C2 relating to the fields F5(T3) and F3(T4), respectively. The query SQL_5: SELECT ALL FROM T3 WHERE F4>1000 was applied to T3 at the time it was executed and stored. In some embodiments, the query SQL_5: SELECT ALL FROM T3 WHERE F4>1000 was only applied to T3 at the time it was executed and stored. The data records of the result SQL_5r nevertheless are related to a company code via the further table T4. The analyzer component can construct the adjusted query SQL_5a to take this into account by an appropriate JOIN expression in the SQL statement: SELECT DISTINCT F3, F5 FROM T3 JOIN T4 ON T3~F1=T4~F1' WHERE F4>1000.

By using this adjusted query, the requested characteristics C1, C2 are mapped to the corresponding fields F5, F3 of the tables T3, T4 and the result SQL_5ar of the adjusted query includes the non-redundant data usage categories to which the data records of T3 belong which were accessed by SQL_5. The corresponding data usage counters CNT-1', CNT-2' and CNT-4' to CNT-6' are incremented accordingly to reflect the database system status in terms of data usage behavior after the query SQL_5 was executed.

Figure 18:
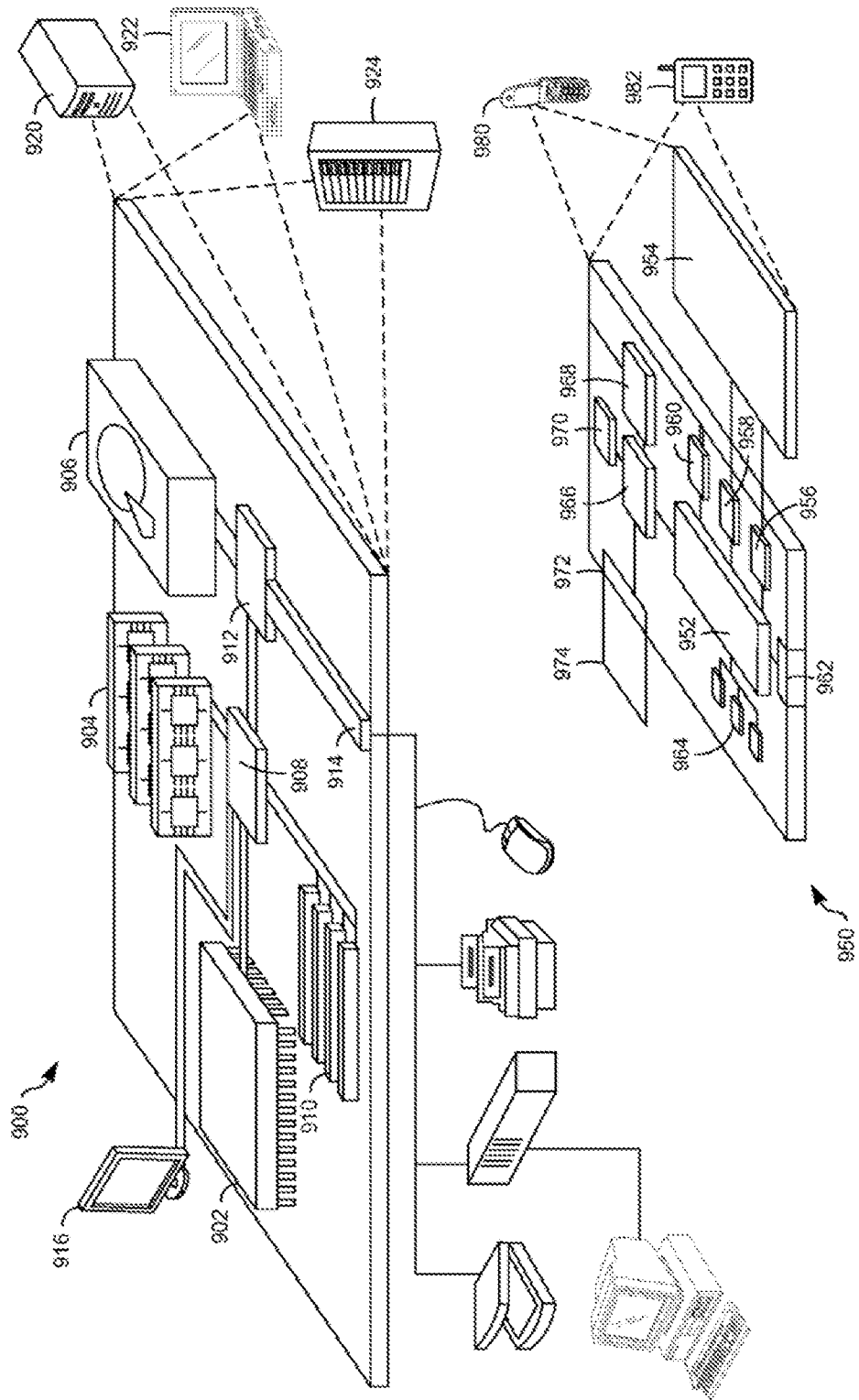
FIG. 18 is a diagram that shows an example of a generic computer device and a generic mobile computer device which may be used with the techniques described herein.

FIG. 18 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to a computer system 100 as illustrated in FIG. 1. Computing device 950 is intended to represent various forms of mobile devices, such as personal digital assistants, cellular telephones, smart phones, and other similar computing devices. For example, computing device 950 may be used by a user as a front end to interact with the computer system 100. The components shown here, their connections and relationships, and their functions, are meant to be exemplary only, and are not meant to limit implementations of the present disclosures described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, EDGE, UMTS, LTE, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a backend component (e.g., as a data server), or that includes a middleware component (e.g., an application server), or that includes a front end component (e.g., a client computer having a graphical user interface or a Web browser through which a user can interact with an implementation of the systems and techniques described here), or any combination of such backend, middleware, or frontend components. The components of the system can be interconnected by any form or medium of digital data communication (e.g., a communication network). Examples of communication networks include a local area network ("LAN"), a wireless local area network ("WLAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer system for determining data usage behavior in a database system wherein an application uses a plurality of tables stored in at least one database system and each table includes one or more fields, the computer system comprising:
    an interface component configured to receive, from one or more applications, a plurality of SQL queries, wherein the SQL queries have data selection conditions to access data stored in the at least one database system, the interface component being further configured to receive one or more characteristics, wherein each characteristic relates to one or more respective fields;
    a data storage component configured to store the received SQL queries;
    an initialization component configured to determine one or more data usage categories, wherein a data usage category is based on one or more characteristics values in stored data records, the one or more characteristics values corresponding to one or more stored field values of the one or more respective fields;
    a data usage analyzer component configured to analyze at least one of the stored SQL queries by:
    comparing the data selection condition of the at least one stored SQL query with the determined one or more data usage categories by adjusting the at least one stored SQL query to transform the at least one stored SQL query into an SQL statement being adapted to retrieve distinct field values of the one or more respective fields associated with the received one or more characteristics while maintaining the remainder of the selection condition of the at least one stored SQL query, and applying the adjusted SQL query to the database; and
    if the data selection condition of the at least one stored SQL query indicates at least one query access to the stored data records including field values in accordance with a particular data usage category, incrementing a data usage counter associated with the particular data usage category matching a selection condition of a particular SQL query launched by at least one of the one or more applications;
    wherein the interface component further comprises a display configured to prompt a user with the data usage counter values associated with the respective data usage categories to initiate a corrective action for the database system.

2. The computer system of claim 1, wherein the initialization component is configured to determine the one or more data usage categories by applying an initialization SQL statement to the database system, the initialization SQL statement being configured to retrieve a combination of distinct field values of the one or more respective fields associated with the received one or more characteristics resulting in a list of vectors with each vector corresponding to a data usage category.

3. The computer system of claim 1, wherein the data usage analyzer component is further configured to increment a data usage counter if the application of the adjusted SQL query results in one or more hits for a corresponding data usage category.

4. The computer system of claim 1, wherein the corrective action includes:
    deletion of the respective data from the database system, if the data usage counter indicates no use of data, and
    archiving the respective data in an archiving system, if the data usage counter is below a high data use threshold value, and
    generating test cases from data for a corresponding application, if the data usage counter is equal or above the high data use threshold value.

5. The computer system of claim 1, wherein a mapping between characteristics and the one or more data fields is implemented as:
    a 1:1 mapping where the characteristics relate to a single field with one or more field values associated with corresponding data usage categories,
    an n:1 mapping where the characteristics relate to multiple fields and each field has one or more field values associated with corresponding data usage categories, or
    a transformation mapping where the characteristics relate to a field whose transformed values are associated with the data usage categories.

6. The computer system of claim 5, wherein the transformation mapping is implemented as:

a transformation mapping as a result of a transformation function applied to a selected field value to generate a transformed value associated with a data usage category; or a transformation mapping defined in a lookup table or lookup view which maps selected field values of a field to corresponding data usage categories.

7. The computer system of claim 1, wherein the data storage component is further configured to store the received SQL queries with a respective querying application identifier and/or a respective querying user identifier; and wherein the data usage analyzer component is further configured to analyze subsets of the stored SQL queries wherein the subsets are grouped by application identifier or user identifier.

8. A computer-implemented method for determining data usage behavior in at least one database system in which an application uses a plurality of tables stored in the at least one database system and each table includes a plurality of fields, the method comprising:

receiving, from one or more applications, a plurality of SQL queries, the SQL queries having data selection conditions to access data records stored in the database system;

storing the received SQL queries;

receiving one or more characteristics, each characteristic relating to one or more respective field;

determining one or more data usage categories, wherein a data usage category is based on one or more characteristics values in stored data records, the one or more characteristics values corresponding to one or more stored field values of the one or more respective fields;

comparing the data selection condition of at least one stored SQL query with the determined one or more data usage categories by adjusting the at least one stored SQL query to transform the at least one stored SQL query into an SQL statement being adapted to retrieve distinct field values of the one or more respective fields associated with the received one or more characteristics while maintaining the remainder of the selection condition of the at least one stored SQL query, and applying the adjusted SQL query to the database; and incrementing a data usage counter associated with an identified data usage category matching a selection condition of a particular SQL query launched by at least one of the one or more applications if the data selection condition of the at least one stored SQL query indicates at least one query access to the stored data records including field values in accordance with the identified data usage category.

9. The method of claim 8, wherein determining one or more data usage categories further comprises:

applying an initialization SQL statement to the database system, the initialization SQL statement being configured to retrieve distinct field values the one or more respective fields associated with the received one or more characteristics resulting in a list of vectors with each vector corresponding to a data usage category.

10. The method of claim 8, wherein incrementing a data usage counter comprises:

incrementing an identified data usage counter if the application of the adjusted SQL query results in at least one hit for the associated data usage category.

11. The method of claim 8, further comprising:

prompting a user with the data usage counter values associated with the respective data usage categories to initiate a corrective action including:

deletion of the respective data from the database system, if the data use counter indicates no use of data, and archiving the respective data in an archiving system, if the data use counter is below a high data use threshold value, and generating test cases from data for a corresponding application, if the data use counter is equal or above the high data use threshold value.

12. The method of claim 8, wherein storing the received SQL queries comprises:

storing the received SQL queries with a respective querying application identifier or a respective querying user identifier; and wherein the comparing and incrementing steps are performed for subsets of the stored SQL queries, the subsets being grouped by application identifier or user identifier.

13. A computer program product for determining application access and data usage behavior in at least one database system wherein an application uses a plurality of tables stored in the at least one database system and a table includes a plurality of fields, the computer program product when loaded into a memory of a computing device and executed by at least one processor of the computing device executes a plurality of instructions including:

receiving, from one or more applications, a plurality of SQL queries, the SQL queries having data selection conditions to access data records stored in the database system;

storing the received SQL queries;

receiving one or more characteristics, wherein each characteristic relates to one or more respective fields;

determining one or more data usage categories wherein a data usage category is based on one or more characteristics values in stored data records, the one or more characteristics values corresponding to one or more stored field values of the one or more respective fields;

comparing the data selection condition of at least one stored SQL query with the determined one or more data usage categories by adjusting the at least one stored SQL query to transform the at least one stored SQL query into an SQL statement being adapted to retrieve distinct field values of the one or more respective fields associated with the received one or more characteristics while maintaining the remainder of the selection condition of the at least one stored SQL query, and applying the adjusted SQL query to the database; and incrementing a data usage counter associated with an identified data usage category matching a selection condition of a particular SQL query launched by at least one of the one or more applications if the data selection condition of the at least one stored SQL query indicates at least one query access to the stored data records including field values in accordance with the identified data usage category.

14. The computer program product of claim 13, wherein determining one or more data usage categories further comprises:

applying an initialization SQL statement to the database system, the initialization SQL statement being configured to retrieve distinct field values the one or more respective fields associated with the received one or more characteristics resulting in a list of vectors, each vector corresponding to a data usage category.

15. The computer program product of claim 13, wherein incrementing a data usage counter comprises:

incrementing an identified data usage counter if the application of the adjusted SQL query results in at least one hit for the associated data usage category.

16. The computer program product of claim 13, wherein the corrective action includes:
- deletion of the respective data from the database system, if the data use counter indicates no use of data,
- archiving the respective data in an archiving system, if the data use counter is below a high data use threshold value, and
- generating test cases from data for a corresponding application, if the data use counter is equal or above the high data use threshold value.

17. The computer program product of claim 13, wherein storing the received SQL queries further comprises:
- storing the received SQL queries with a respective querying application identifier or a respective querying user identifier; and wherein the comparing and incrementing instructions are performed for subsets of the stored SQL queries, the subsets being grouped by application identifier or user identifier.

18. The computer system of claim 1, wherein the result of applying the adjusted query to the database includes a non-redundant list of vectors which corresponds to all data usage categories affected by the stored SQL query.

19. The method of claim 8, wherein the result of applying the adjusted query to the database includes a non-redundant list of vectors which corresponds to all data usage categories affected by the stored SQL query.

20. The computer program product of claim 13, wherein the result of applying the adjusted query to the database includes a non-redundant list of vectors which corresponds to all data usage categories affected by the stored SQL query.

* * * * *